United States Patent
Abe et al.

(10) Patent No.: US 6,246,646 B1
(45) Date of Patent: Jun. 12, 2001

(54) FOCUS CONTROL APPARATUS FOR MULTILAYER OPTICAL RECORDING MEDIUM

(75) Inventors: Hiroyuki Abe; Shinichi Naohara; Takeshi Sato; Alex Bradshaw; Kazushige Kawana; Hideaki Watarihana; Norio Matsuda; Kenichi Takahashi, all of Kawagoe (JP)

(73) Assignee: Pioneer Electronic Corporation, Tokyo (JP)

( * ) Notice: Subject to any disclaimer, the term of this patent is extended or adjusted under 35 U.S.C. 154(b) by 0 days.

(21) Appl. No.: 09/114,880

(22) Filed: Jul. 14, 1998

(30) Foreign Application Priority Data

Jul. 15, 1997 (JP) .................................................. 9-189534

(51) Int. Cl.$^7$ ...................................................... G11B 7/09
(52) U.S. Cl. ................................. 369/44.27; 369/44.25; 369/112.01
(58) Field of Search ............................ 369/44.27, 44.28, 369/44.29, 44.34, 44.25, 44.35, 275.3, 94, 93, 112, 275.1, 286, 54, 58, 47.1, 53.1, 112.01

(56) References Cited

U.S. PATENT DOCUMENTS 5,748,597 * 5/1998 Kim ........................................ 369/94
6,027,594 * 2/2000 Nishiuchi et al. .................... 369/286

* cited by examiner

Primary Examiner—Muhammad Edun
(74) Attorney, Agent, or Firm—Sughrue, Mion, Zinn, Macpeak & Seas, PLLC

(57) ABSTRACT

A focus control apparatus for a multilayer optical recording medium performs an adequate focus jump on a multilayer optical recording medium. Threshold values are set according to the amount of a level change in a focus error signal of a loaded multilayer optical recording medium, and focus jump control is conducted based on the result of comparison between the level of the focus error signal and the set threshold values. Positive and negative threshold values to be compared with the level of the focus error signal to detect a zero-crossing point of the focus error signal are set in accordance with the amount of a level change in the focus error signal, after which an acceleration operation of the focus actuator is started in response to a focus jump instruction to shift the focus position of read light for a focus jump, the acceleration operation is stopped in accordance with zero-crossing detection, a deceleration operation of the focus actuator is started thereafter and is stopped in accordance with zero-crossing detection, so that the operation returns to the focus servo operation.

39 Claims, 11 Drawing Sheets

FOCUS CONTROL APPARATUS FOR MULTILAYER OPTICAL RECORDING MEDIUM

BACKGROUND OF THE INVENTION

1. Field of the Invention

The present invention relates to a focus control apparatus installed in a reproduction apparatus which reproduces data from a multilayer optical recording medium.

2. Description of Related Art

Figure 1:
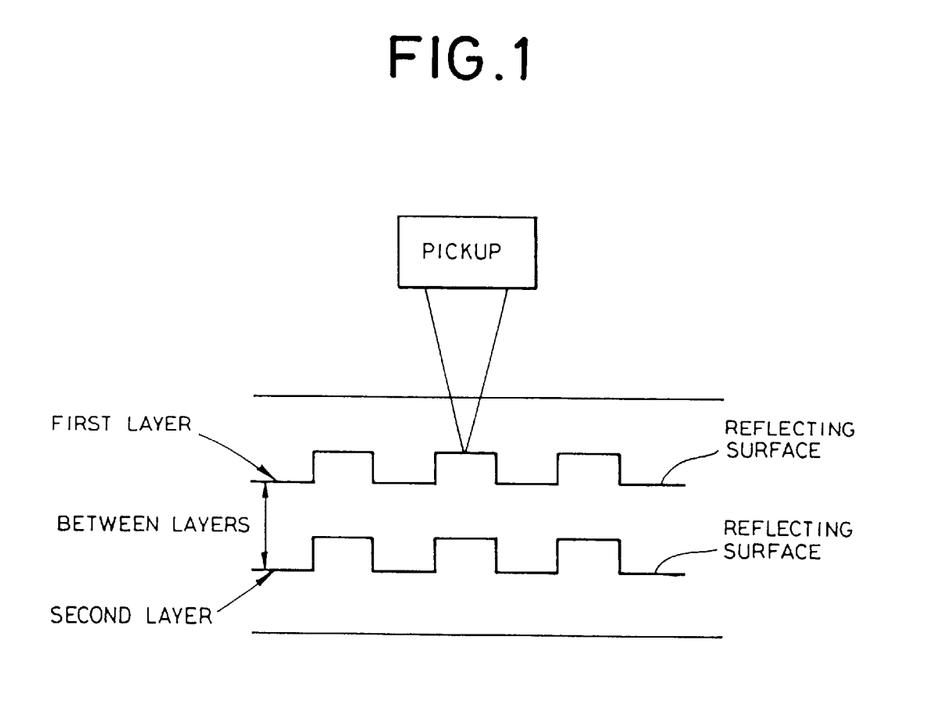
FIG. 1 is a diagram showing the cross section of a double-layer optical disk.

One way to improve the recording density of a disk is multiplexing of information in a direction perpendicular to the disk's surface. A multilayer optical disk is capable of implementing such perpendicularly multiplexed information recording. With a double-layer optical disk in use, for example, first and second layers are formed with a spacer region in between as shown in FIG. 1, and the first layer closer to the light irradiated surface of the disk is made translucent so that light receives the second layer.

In reproduction of such a multilayer optical disk, changing the layer from which recorded information is to be read requires that a focus control apparatus should carry out a focus jump operation to rapidly focus read light on the next reading layer.

Normally, the focus jump operation to shift the focal point of read light from the information recorded surface on one layer to the information recorded surface on another is executed based on zero-crossing detection of a focus error signal which is generated based on the output of a pickup.

Specifically, the pickup is provided with a focus actuator, a read-light emitting optical system, for example, which moves an objective lens for determining the focal point of the optical system along the optical axis to thereby shift the focal point of the read light in a direction perpendicular to the surface of the disk. In the initial stage of the focus jump operation, this focus actuator is supplied with an acceleration signal or a focus jump enable signal to shift the focal point of the read light to a target recording surface. Based on the timing of zero-crossing which is detected one after another from a focus error signal acquired during displacement of the focus actuator that is implemented in response to the acceleration signal, a series of operations of terminating the supply of the acceleration signal, supplying a deceleration signal to the focus actuator to stop the displacement of the focus actuator that has taken place in response to the acceleration signal or stopping supplying the deceleration signal and restarting focus servo on the target recording surface.

In this focus control apparatus for a multilayer optical disk, while the point at which a focus error signal passes a zero-crossing point is detected during a focus jump operation, zero-crossing detection is actually carried out with a level a little apart from the zero level taken as a threshold value in consideration of an influence of a noise component or the like. However, the amount of a change in the level of the focus error signal during a focus jump operation is not always constant due to a difference in reflectance from one layer of the disk to another or some stain or the like on the objective lens. If the threshold value is fixed, therefore, a stable focus jump cannot be expected when the supply of an acceleration signal or deceleration signal is stopped at the zero-crossing timing that has been detected in accordance with the fixed threshold value.

OBJECT AND SUMMARY OF THE INVENTION

Accordingly, it is an objective of the present invention to provide a focus control apparatus for a multilayer optical recording medium, which can adequately perform a focus jump on a multilayer optical recording medium.

According to one aspect of this invention, a focus control apparatus for a multilayer optical recording medium for implementing such focus jump control as to temporarily release a focus servo on one layer of a loaded multilayer optical recording medium, shift a focus position of read light on another target layer and then restart the focus servo on the another target layer, is characterized in that a threshold value corresponding to an amount of a change in a level of a focus error signal of the loaded multilayer optical recording medium is set, and the focus jump control is carried out based on a result of comparison between the level of the focus error signal and the set threshold value.

According to another aspect of this invention, a focus control apparatus for a playback apparatus for playing back a recording medium having information recording surfaces on at least two layers formed perpendicular to a surface of the recording medium, comprises pickup means for irradiating a read light on the recording medium, receiving return light of the read light from the recording medium, and generating a read signal indicative of information recorded on the recording medium and a focus error signal indicative of a focus error of the read light with respect to each of the information recording surfaces; zero-crossing detection means for detecting zero-crossing by comparing a level of the focus error signal with a positive threshold value and a negative threshold value; instruction means for generating a focus jump instruction; drive means for performing a focus servo operation to drive a focus actuator of the pickup means in order to focus the read light on each target information recording surface in accordance with the focus error signal, starting an acceleration operation of the focus actuator in response to the focus jump instruction in order to shift a focus position of the read light from the recording surface of one of the at least two layers to the recording surface of another layer, stopping the acceleration operation in accordance with zero-crossing detection by the zero-crossing detection means, thereafter starting a deceleration operation of the focus actuator and then stopping the deceleration operation and returning to the focus servo operation in accordance with zero-crossing detection by the zero-crossing detection means; and threshold value setting means for setting the positive threshold value and the negative threshold value according to an amount of a change in a level of the focus error signal.

DETAILED DESCRIPTION OF THE PREFERRED EMBODIMENT

A preferred embodiment of the present invention will now be described in detail referring to the accompanying drawings.

Figure 2:
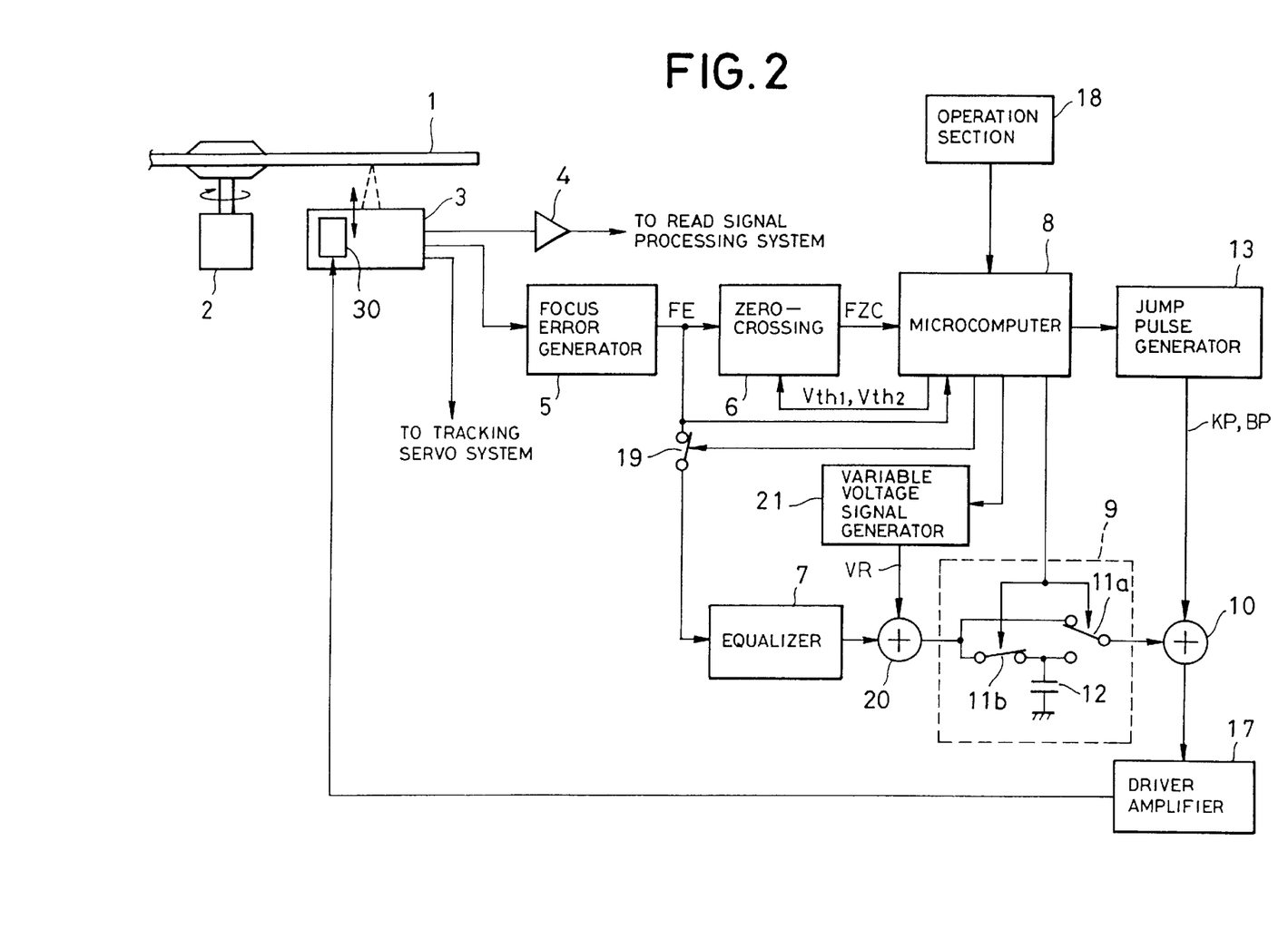
FIG. 2 is a block diagram depicting the constitution of a focus control apparatus according to this invention.

FIG. 2 shows the schematic constitution of a double-layer optical disk player which uses a focus control apparatus according to one embodiment of this invention.

Referring to FIG. 2, a disk 1 loaded in the player is a double-layer optical disk shown in FIG. 1, is spun by a spindle motor 2 and is irradiated with read light which is produced by a pickup 3. This read light reaches the recording surface (reflection surface) of a first layer or a second layer through a protection layer of the disk 1, and is modulated with so-called recorded marks which carry recorded information, such as pits formed on the recording surface. The modulated light becomes reflected light from the recording surface and returns to the pickup 3.

The pickup 3 not only generates the read light but also receives the reflected light from the disk 1 and performs photoelectric conversion to generate various kinds of electric signals according to the amount and/or the status of the reflected light. Of the electric signals generated by the pickup 3, a read signal mainly having a signal component according to recorded information on the disk 1 (so-called an RF (Radio Frequency) signal) is amplified by an RF amplifier 4 and is then transferred to an unillustrated read signal processing system. The read signal processing system reproduces a final audio or video signal or a computer data signal from the RF signal, and sends the reproduced signal outside the player, for example.

A focus error generator 5 generates a focus error signal FE representing a focus error of the read light with respect to the recording surface, based on another electric signal generated by the pickup 3. A further electric signal generated by the pickup 3 is supplied to an unillustrated tracking servo system. Based on this electric signal, the tracking servo system generates a tracking error signal according to which the irradiation position of the read light is so controlled as to coincide with the center of a recording track of the disk 1.

One way of generating the focus error signal is to let the reflected light from the disk pass through a cylindrical lens as the light receiving system of the pickup 3 to thereby impart astigmatism to the reflected light and allow the resultant reflected light to be received by a ¼ photodetector. The light-receiving surface of the ¼ photodetector has four light-receiving portions separated by two lines perpendicularly crossing at the light reception center. As the receiving reflected light changes its shape and intensity at the light-receiving surface according to the focus status of the read light on the recording surface of the disk, photoelectrically converted signals from the light-receiving portions, located point symmetrical to one another with respect to the light reception center, are added together, yielding two added signals. A signal representing a difference between those two added signals is output as a focus error signal.

In an example of embodiment in which a read signal is generated, with the ¼ photodetector in use, a read signal can be acquired from the sum of the photoelectrically converted signals from all the light-receiving portions or may be obtained from another detector.

Figure 3:
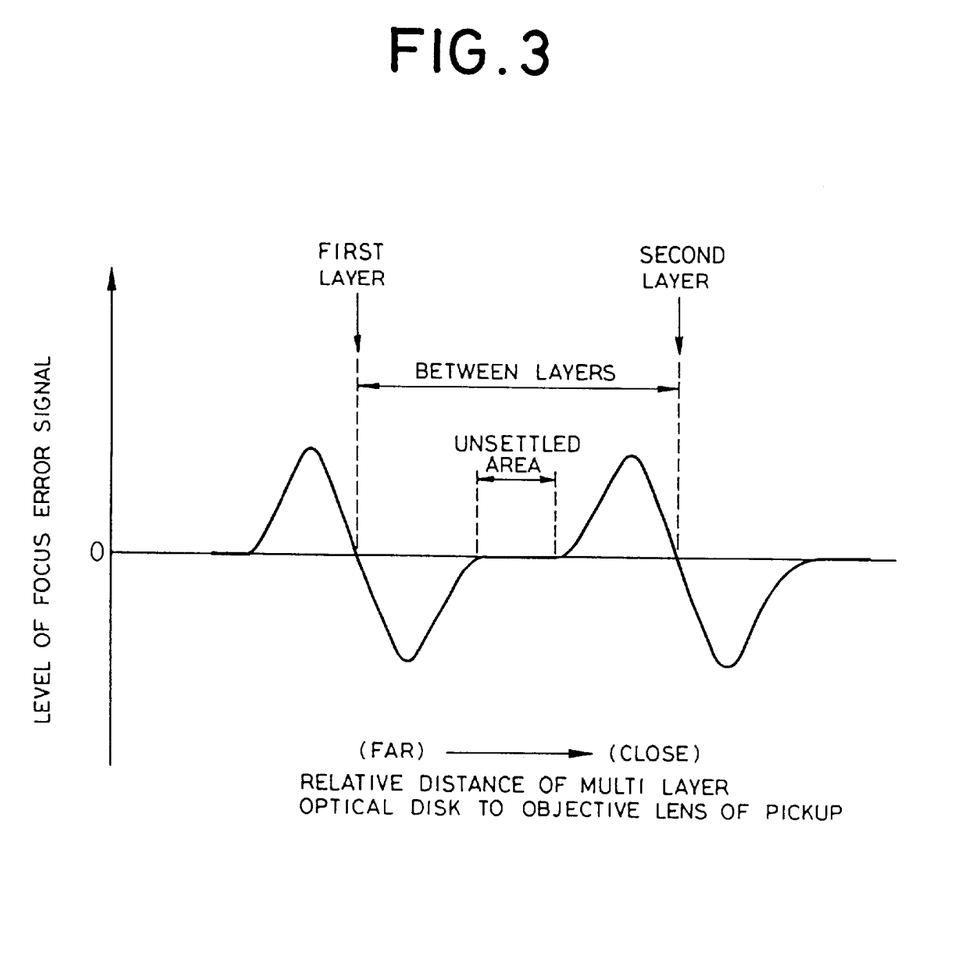
FIG. 3 is a diagram illustrating the change characteristic of a focus error signal in a focus jump.

The focus error signal has a zero level when the relative distance of the objective lens of the pickup 3 to each of the first and second layers is a reference value, has such an S-shaped characteristic that the output level continuously changes according to a shift from the reference value, and the focus error signals of the individual layers have the opposite polarities between the adjoining first and second layers, as shown in FIG. 3. In a midway between the layers lies an unsettled area where no focus error signal is obtained.

Methods of generating a tracking error signal include a 3-beam method, a phase difference method and a push-pull method, the latter two for a case where a tracking error is provided by a single light beam.

The pickup 3 incorporates a focus actuator 30 which moves, along the optical axis, the objective lens for irradiating the read light, emitted from the light source, onto the disk 1. The focus actuator 30 shifts the objective lens perpendicular to the surface of the disk 1 in accordance with the level and polarity of a drive signal to be discussed later.

The output of the focus error generator 5 is connected to a zero-crossing detector 6 and is connected via an ON/OFF switch 19 to an equalizer 7. The zero-crossing detector 6 detects that the level of the focus error signal FE output from the focus error generator 5 passes two, positive and negative threshold values Vth1 and Vth2 close to the zero level, generates a zero-crossing detection signal FZC corresponding to the detection result, and sends the signal FZC to a microcomputer 8. The equalizer 7 performs a process like wave equalization on the focus error signal FE supplied when the ON/OFF switch 19 is on, and sends the equalized focus error signal to an adder 20 and also to an adder 10 via a hold circuit 9. Connected to the adder 20 is a variable voltage signal generator 21 besides the equalizer 7. This generator 21 generates a voltage signal VR whose level varies in accordance with a lens-down instruction signal and a lens-up instruction signal generated from the microcomputer 8, and sends the voltage signal VR to the adder 20.

The hold circuit 9 has a changeover switch 11a, an ON/OFF switch 11b and a capacitor 12. When the ON/OFF switch 11b is on, the output signal of the equalizer 7 is supplied via the ON/OFF switch 11b to the capacitor 12 and stored there. The ON/OFF switch 11b is a unidirectional switch element like a transistor, so that no current flows through the ON/OFF switch 11b from the capacitor 12. The changeover switch 11a selectively sends either the output signal of the equalizer 7 or the stored voltage in the capacitor 12 to the adder 10. In a focus servo mode, the microcomputer 8 sets the changeover switch 11a to the equalizer 7 side and sets the ON/OFF switch 11b on.

Based on the zero-crossing detection signal FZC, the microcomputer 8 generates a kick-pulse generation instruction signal for accelerating and shifting the focus actuator 30 in a predetermined direction, a kick pulse stop instruction signal, a brake-pulse generation instruction signal for decelerating the focus actuator 30, which is in motion in response to the kick pulse, and stopping the displacement of the focus actuator 30 in the predetermined direction, and a brake-pulse stop instruction signal. Those instruction signals are supplied to a jump pulse generator 13.

The jump pulse generator 13 produces a jump pulse, which consists of a kick pulse KP and brake pulse BP, in accordance with a pulse generation instruction signal and a pulse stop instruction signal from the microcomputer 8, and gives associated polarities to the kick pulse KP and brake pulse BP. The output of the jump pulse generator 13 is connected to the adder 10.

The adder 10 adds the signal from the hold circuit 9 and the jump pulse from the jump pulse generator 13, and sends the addition result to a driver amplifier 17. The driver amplifier 17 generates a drive signal according to the output of the adder 10, and sends the drive signal to the focus actuator 30.

When the disk 1 is loaded in a playback apparatus, the microcomputer 8 executes a zero-crossing threshold value setting operation for setting the threshold values Vth1 and Vth2 of the zero-crossing detector 6.

Figure 4:
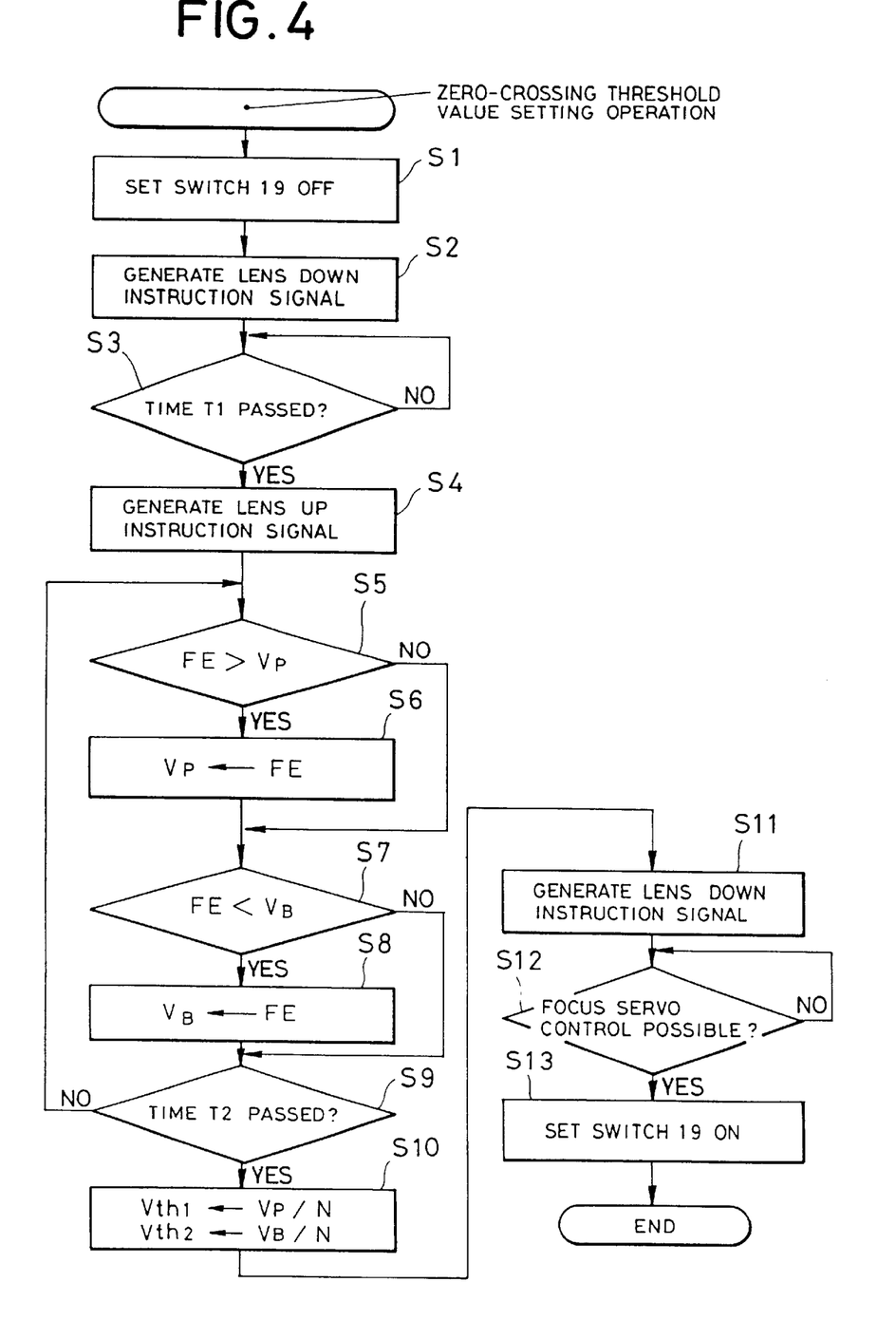
FIG. 4 is a flowchart illustrating a zero-crossing threshold value setting operation.
Figure 5A:
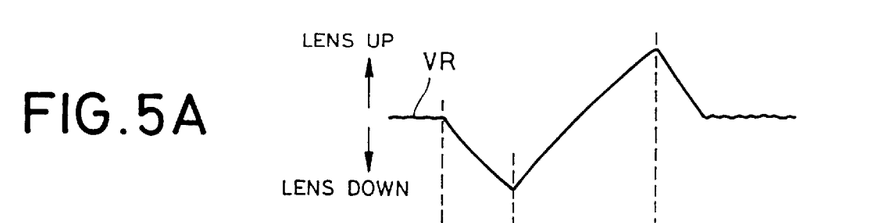
FIGS. 5A and 5B are waveform charts showing the zero-crossing threshold value setting operation in FIG. 4.

In this zero-crossing threshold value setting operation, as shown in FIG. 4, the microcomputer 8 first sets the ON/OFF switch 19 off (step S1) to cut off the focus servo loop. Then, the microcomputer 8 generates the lens-down instruction signal to the variable voltage signal generator 21 (step S2). In accordance with the lens-down instruction signal, the variable voltage signal generator 21 generates the voltage signal VR which gradually becomes larger on the negative side as shown in FIG. 5A. This voltage signal VR is supplied via the adder 20, the hold circuit 9 and the adder 10 to the driver amplifier 17, which drives the focus actuator 30 according to the voltage signal VR to sift the objective lens away from the surface of the disk 1.

The microcomputer 8 determines if a predetermined time T1 has passed since the generation of the lens-down instruction signal (step S3). The predetermined time T1 is equivalent to a time need for the output voltage signal VR of the variable voltage signal generator 21 to have the minimum level (maximum level on the negative side), and the voltage signal VR of the minimum level sets the objective lens to position farthest from the disk 1. When the predetermined time T1 has passed since the generation of the lens-down instruction signal, therefore, the microcomputer 8 generates the lens-up instruction signal to the variable voltage signal generator 21 (step S4). In accordance with the lens-up instruction signal, the variable voltage signal generator 21 generates the voltage signal VR which gradually becomes larger on the positive side as shown in FIG. 5A. This voltage signal VR changing toward the positive side is supplied via the adder 20, the hold circuit 9 and the adder 10 to the driver amplifier 17, which drives the focus actuator 30 according to the voltage signal VR to sift the objective lens toward the surface of the disk 1.

While the objective lens is moving closer to the disk 1 from the farthest position, the microcomputer 8 reads the focus error signal FE and determines if the focus error signal FE is greater than a positive peak voltage $V_P$ (step S5). The positive peak voltage $V_P$ is initially set to 0 V. When FE>$V_P$, the positive peak voltage $V_P$ is set equal to the read focus error signal FE (step S6). Then, the microcomputer 8 determines if the read focus error signal FE is smaller than the negative peak voltage $V_B$ (step S7). The negative peak voltage $V_B$ is initially set to 0 V. When FE<$V_B$, the negative peak voltage $V_B$ is set equal to the read focus error signal FE (step S8). When it is determined in step S5 that FE≦$V_P$, step S7 is executed immediately, and when it is determined in step S7 that FE≧$V_B$, step S9 next to step S8 is executed immediately.

Figure 5B:
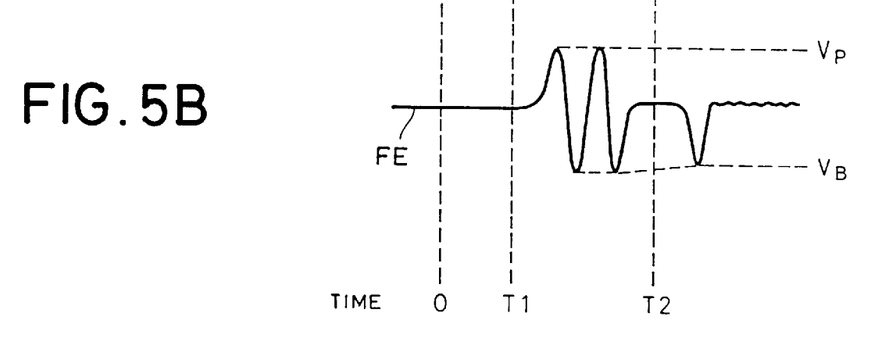

The microcomputer 8 determines in step S9 if a predetermined time T2 has passed since the generation of the lens-down instruction signal. The predetermined time T2 is equivalent to a time need for the level of the output voltage signal VR of the variable voltage signal generator 21 to become maximum, and the voltage signal VR of the maximum level sets the objective lens to position closest to the disk 1 in its moving range. As the objective lens has moved over the entire moving range, therefore, the focus error signal has a waveform as shown in FIG. 5B and the focus position of the read light has shifted over the first and second layers of the disk 1. That is, the positive peak voltage $V_P$ and the negative peak voltage $V_B$ of the focus error signal have been detected.

When the microcomputer 8 determines in step S9 that the predetermined time T2 has passed since the generation of the lens-down instruction signal, the microcomputer 8 computes the positive and negative threshold values Vth1 and Vth2 (step S10). The positive threshold value Vth1 is computed from $V_P$/N, and the negative threshold value Vth2 from $V_B$/N.

After execution of step S10, the microcomputer 8 generates the lens-down instruction signal to the variable voltage signal generator 21 (step S11). In accordance with the lens-down instruction signal, the variable voltage signal generator 21 generates again the voltage signal VR which gradually changes toward the negative side to shift the objective lens away from the surface of the disk 1. After generating the lens-down instruction signal, the microcomputer 8 monitors the focus error signal FE and determines if focus servo control should be carried out (step S12). When the focus position of the read light reaches near the recording surface of the second layer, for example, setting the focus error signal FE nearly to the zero level, generation of the lens-down instruction signal is stopped and the ON/OFF switch 19 is set on (step S13). As a result, the focus error signal FE is supplied via the switch 19, the equalizer 7, the adder 20, the hold circuit 9 and the adder 10 to the driver amplifier 17. The driver amplifier 17 drives the focus actuator 30 in such a way as to set the level of the focus error signal FE to zero, thus starting the servo control operation.

The determination in step S12 can be made from the zero-crossing detection by the zero-crossing detector 6 with respect to the threshold value Vth1.

Figure 6:
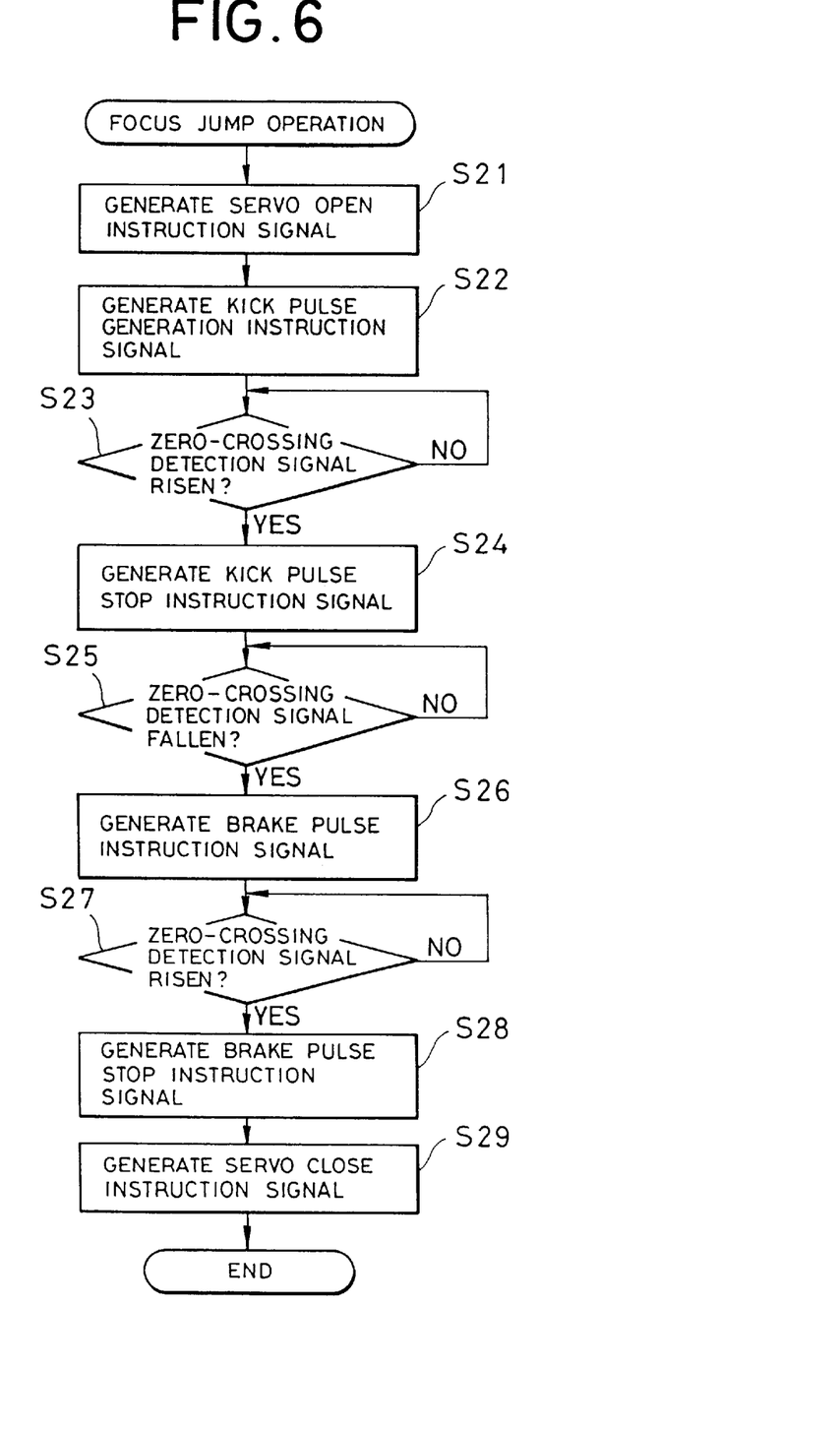
FIG. 6 is a flowchart illustrating a focus jump operation.

Upon reception from an operation section 18 of a focus jump signal for moving the focus position of read light to the recording surface of another layer, the microcomputer 8 interrupts the process that has been undergoing, and starts a focus jump operation illustrated in FIG. 6. In this focus jump operation the focus position is to be shifted from the recording surface of the first layer to the recording surface of the second layer.

Figure 7A:
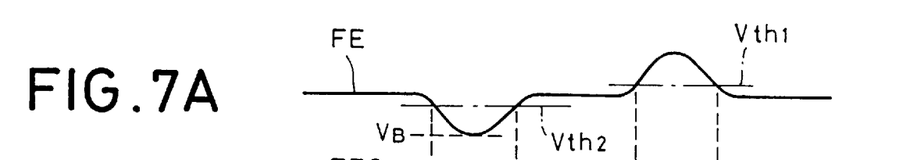
FIGS. 7A through 7D are waveform charts illustrating the focus jump operation.

First, the microcomputer 8 generates a servo open signal SO (step S21). The servo open signal switches the changeover switch 11a of the hold circuit 9 over to the capacitor 12 side and sets the ON/OFF switch 11b off. This renders the focus servo system off as shown in FIG. 7C. Consequently, the storage level of the capacitor 12 of the hold circuit 9 or the level of the focus error signal immediately before the OFF state is held and is output to the adder 10. The microcomputer 8 generates the kick-pulse generation instruction signal (step S22). In accordance with the kick-pulse generation instruction signal, the jump pulse generator 13 generates a kick pulse as shown in FIG. 7D, and sends the kick pulse to the adder 10. The adder 10 adds the positive high level of the kick pulse and the held level output from the hold circuit 9 together and the drive signal FD corresponding to the addition result is supplied to the focus actuator 30 from the driver amplifier 17. During the generation period of the kick pulse, therefore, the actuator 30 is forcibly accelerated in a direction in which the focus position of read light is moved to a new target recording surface. Accordingly, as the focus position of the read light moves away from the followed-up recording surface, the level of the focus error signal FE which has been nearly zero so far changes in such a valley-like form that the level becomes larger on the negative side and returns to the zero level again after reaching the negative peak, as shown in FIG. 7A.

Figure 7B:
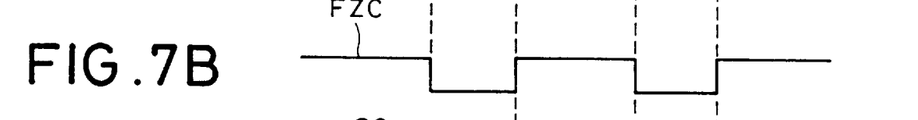
Figure 7C:
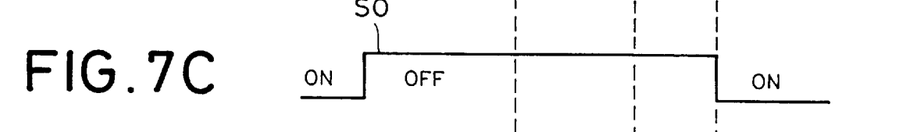
Figure 7D:
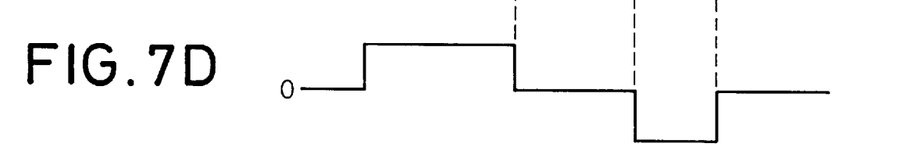

The zero-crossing detection signal FZC output from the zero-crossing detector 6 falls when the level of the focus error signal FE shifts away from the zero level on the negative side and passes the threshold value Vth2, and rises when the level of the focus error signal FE thereafter passes the threshold value Vth2 before returning to the zero level, as shown in FIG. 7B.

After executing step S22, the microcomputer 8 determines if the zero-crossing detection signal FZC has risen (step S23). When the zero-crossing detection signal FZC has risen, the microcomputer 8 generates the kick pulse stop instruction signal (step S24). In accordance with the kick pulse stop instruction signal, the jump pulse generator 13 stops generating the kick pulse.

After generation of the kick pulse is stopped, the moment of inertia originated in response to the kick pulse causes the focus actuator 30 to keep moving to shift the focus position of the read light toward the recording surface of the second recording layer while slowing down its speed. During the movement of the focus actuator 30, the focus error signal FE returns to nearly the zero level, then reaches the unsettled area, after which the second layer will exercise an influence on the focus error signal FE as the focus actuator 30 moves further. That is, the level of the focus error signal FE changes in such a valley-like form that the level gradually becomes larger on the positive side due to the influence of the second layer, reaches a positive peak and then returns to the zero level. The zero-crossing detection signal FZC falls when the level of the focus error signal FE shifts away from the zero level on the positive side and passes the threshold value Vth1, and rises when the level of the focus error signal FE thereafter passes the threshold value Vth1 before returning to the zero level, as shown in FIG. 7B.

After executing step S24, the microcomputer 8 determines if the zero-crossing detection signal FZC has fallen (step S25). When the zero-crossing detection signal FZC has fallen, the microcomputer 8 generates the brake-pulse generation instruction signal (step S26). In accordance with the brake-pulse generation instruction signal, the jump pulse generator 13 generates the brake pulse of a negative level as shown in FIG. 7D, and sends the brake pulse to the adder 10. The adder 10 adds the low level of the brake pulse and the held level output from the hold circuit 9 together and sends the addition result to the driver amplifier 17. Consequently, the drive signal FD for stopping the movement of the focus position of the read light to the target recording surface is supplied to the focus actuator 30, which in turn gradually slows down the displacement speed.

After executing step S26, the microcomputer 8 determines if the zero-crossing detection signal FZC has risen (step S27). When the zero-crossing detection signal FZC has risen, the microcomputer 8 generates the brake-pulse stop instruction signal (step S28). In accordance with the brake-pulse stop instruction signal, the jump pulse generator 13 stops generating the brake pulse. Thereafter, the microcomputer 8 generates a servo-close instruction signal SC (step S29). The servo-close instruction signal switches the changeover switch 11a of the hold circuit 9 over to the equalizer 7 side and sets the ON/OFF switch 11b on. This causes the focus error signal FE to be supplied via the equalizer 7 and the adders 20 and 10 to the driver amplifier 17, after which the focus actuator 30 carries out the normal focus servo operation to permit the focus position of the read light to follow up the target recording surface of the second layer, based on the focus error signal FE.

As the focus jump operation ends, the microcomputer 8 goes to, for example, a mode for reproducing recorded information from the recording surface of the second layer.

Figure 8:
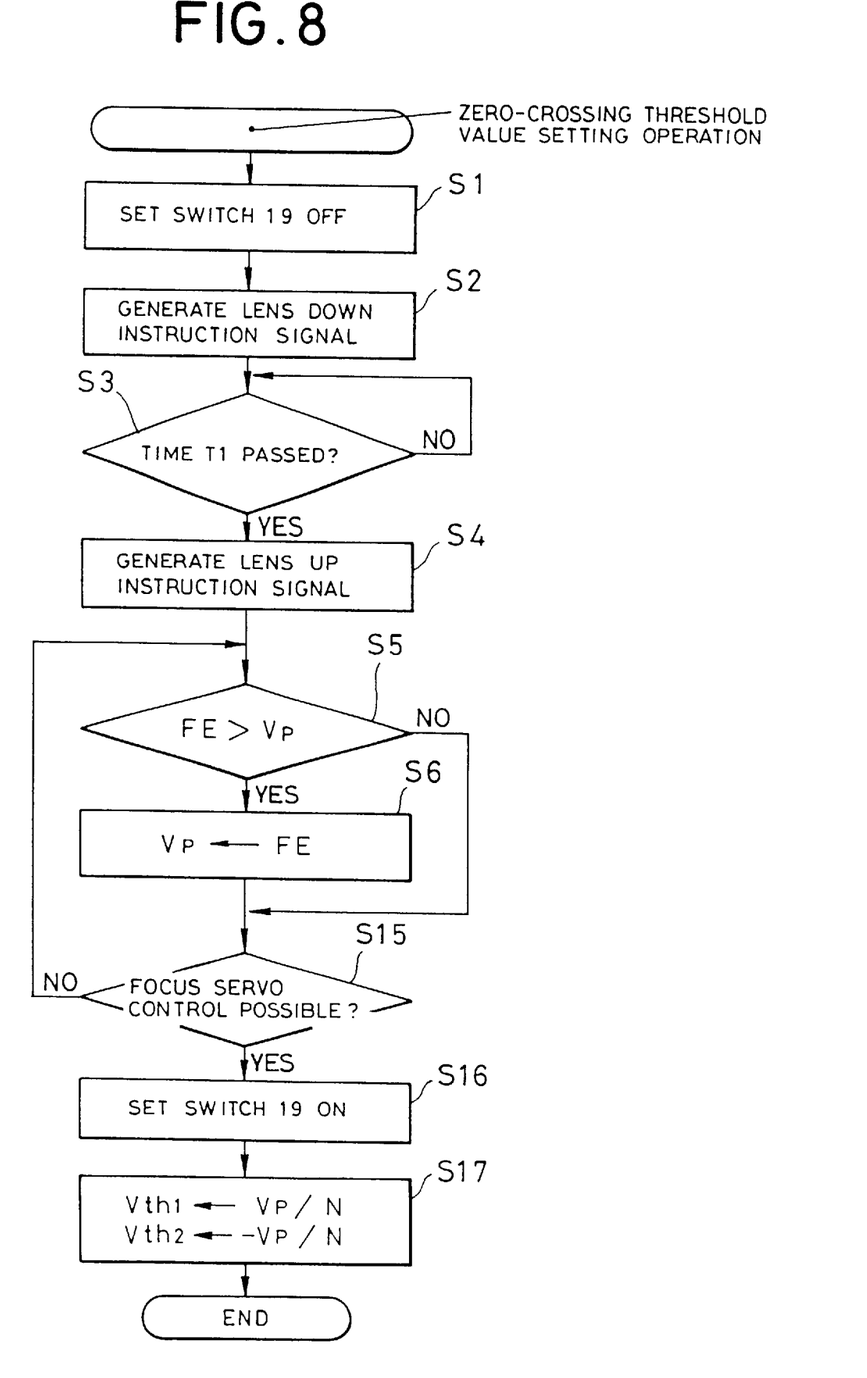
FIG. 8 is a flowchart depicting another zero-crossing threshold value setting operation.

FIG. 8 illustrates another zero-crossing threshold value setting operation. In this zero-crossing threshold value setting operation, the microcomputer 8 executes the same operation as steps S1 to S6 shown in FIG. 4, then monitors the focus error signal FE to determine if the focus servo control should be carried out in step S15. As the threshold value Vth1 has not been set at this point of time, whether or not the focus servo control should be performed is discriminated in accordance with the result of the zero-crossing detection by the zero-crossing detector 6 with respect to the temporary threshold value Vth1 (which may be the initial value). When it is not yet necessary to execute the focus servo control, the flow returns to step S5.

When the level of the focus error signal FE becomes nearly zero, at which the focus servo control should be performed, the generation of the lens-up instruction signal is stopped and the ON/OFF switch 19 is set on (step S16). This causes the focus error signal FE to be supplied to the driver amplifier 17 via the switch 19, the equalizer 7, the adder 20, the hold circuit 9 and the adder 10. Accordingly, the driver amplifier 17 drives the focus actuator 30 in such a way as to set the level of the focus error signal FE to zero, starting the servo control operation. The microcomputer 8 computes the positive and negative threshold values Vth1 and Vth2 (step S17). The positive threshold value Vth1 is calculated from $V_P/N$, and the negative threshold value Vth2 from $-V_P/N$.

Figure 9A:
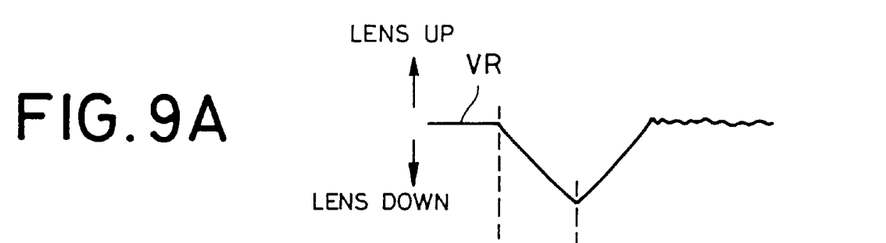
FIGS. 9A and 9B are waveform charts showing the zero-crossing threshold value setting operation in FIG. 8.
Figure 9B:
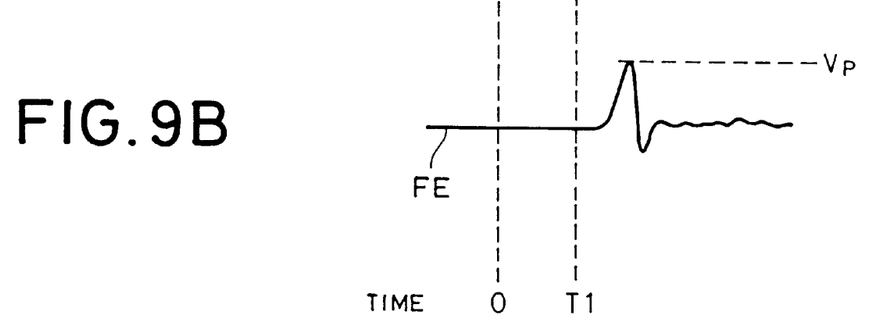

FIG. 9A shows the voltage signal VR in the zero-crossing threshold value setting operation in FIG. 8, and FIG. 9B shows the waveform of the focus error signal then.

As the negative threshold value Vth2 is a temporary value in the zero-crossing threshold value setting operation shown in FIG. 8, the negative threshold value Vth2 is set again in the focus jump operation.

Figure 10:
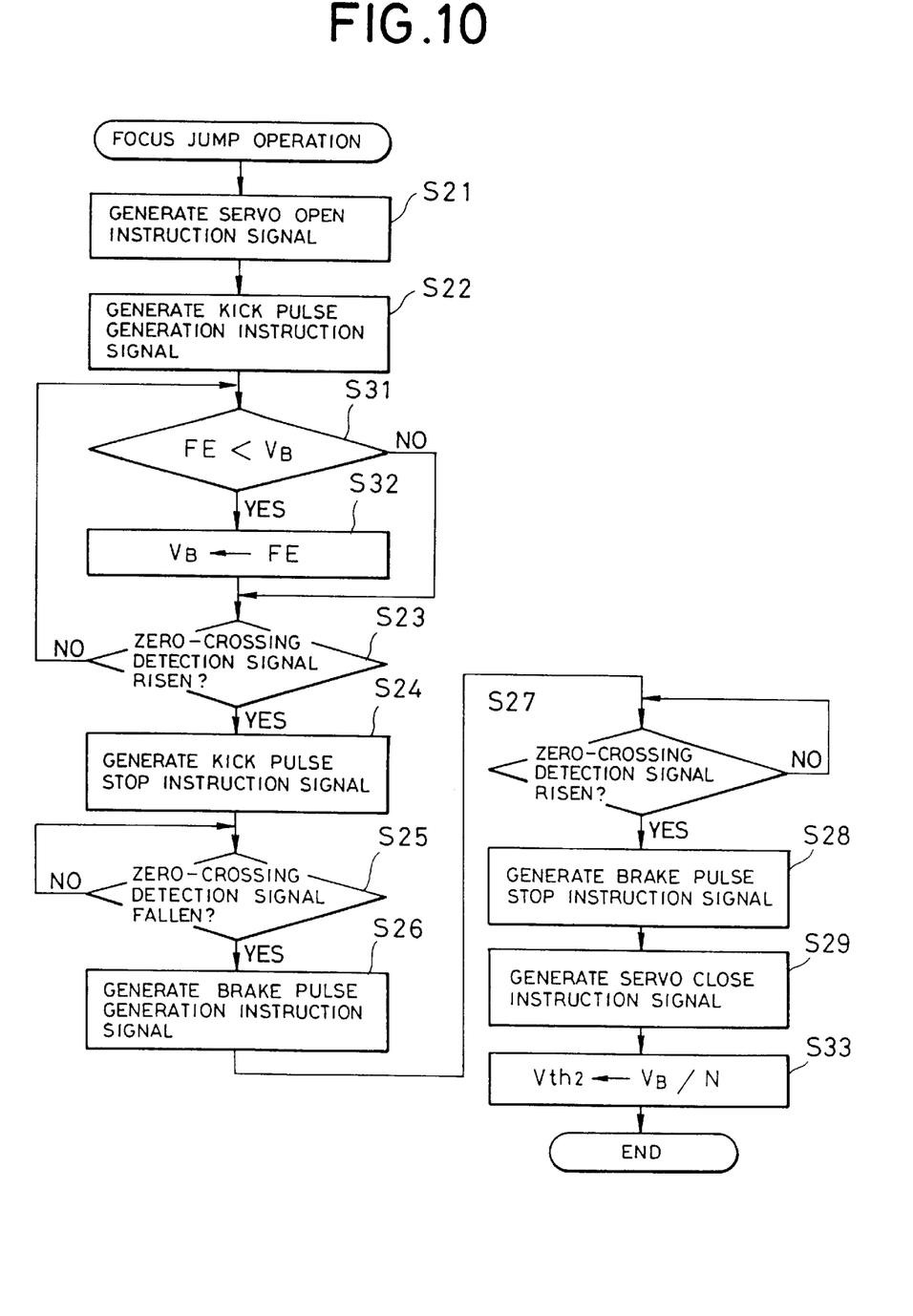
FIG. 10 is a flowchart showing another kick/brake condition setting operation.

In the focus jump operation associated with the zero-crossing threshold value setting operation in FIG. 8, after execution of step S22 similar to that in the zero-crossing threshold value setting operation in FIG. 6, the focus error signal FE is read and it is determined if the focus error signal FE is smaller than the negative peak voltage $V_B$ (step S31), as shown in FIG. 10. The negative peak voltage $V_B$ is set to the initial value (e.g., 0). When $FE<V_B$, the negative peak voltage $V_B$ is set equal to the read focus error signal FE (step S32). This negative peak voltage $V_B$ has the minimum level of the focus error signal FE as shown in FIG. 7A.

After generating the servo-close instruction signal in step S29, the microcomputer 8 computes the negative threshold value Vth2 from $V_B/N$ (step S33). For each focus jump operation, therefore, the negative threshold value Vth2 is calculated in accordance with the negative peak voltage $V_B$. The negative threshold value Vth2 may be computed only in the first focus jump operation.

Although a positive peak value is detected and positive and negative threshold values are computed according to the positive peak value in the above-described embodiment, a negative peak value may be detected instead so that the positive and negative threshold values are computed according to the negative peak value. Further, the positive threshold value, not the negative threshold value, may be set again during the focus jump operation.

Although "N" is the same positive value for the positive threshold value and the negative threshold value in the above-described embodiments, it may have different values for the positive threshold value and the negative threshold value.

Figure 11:
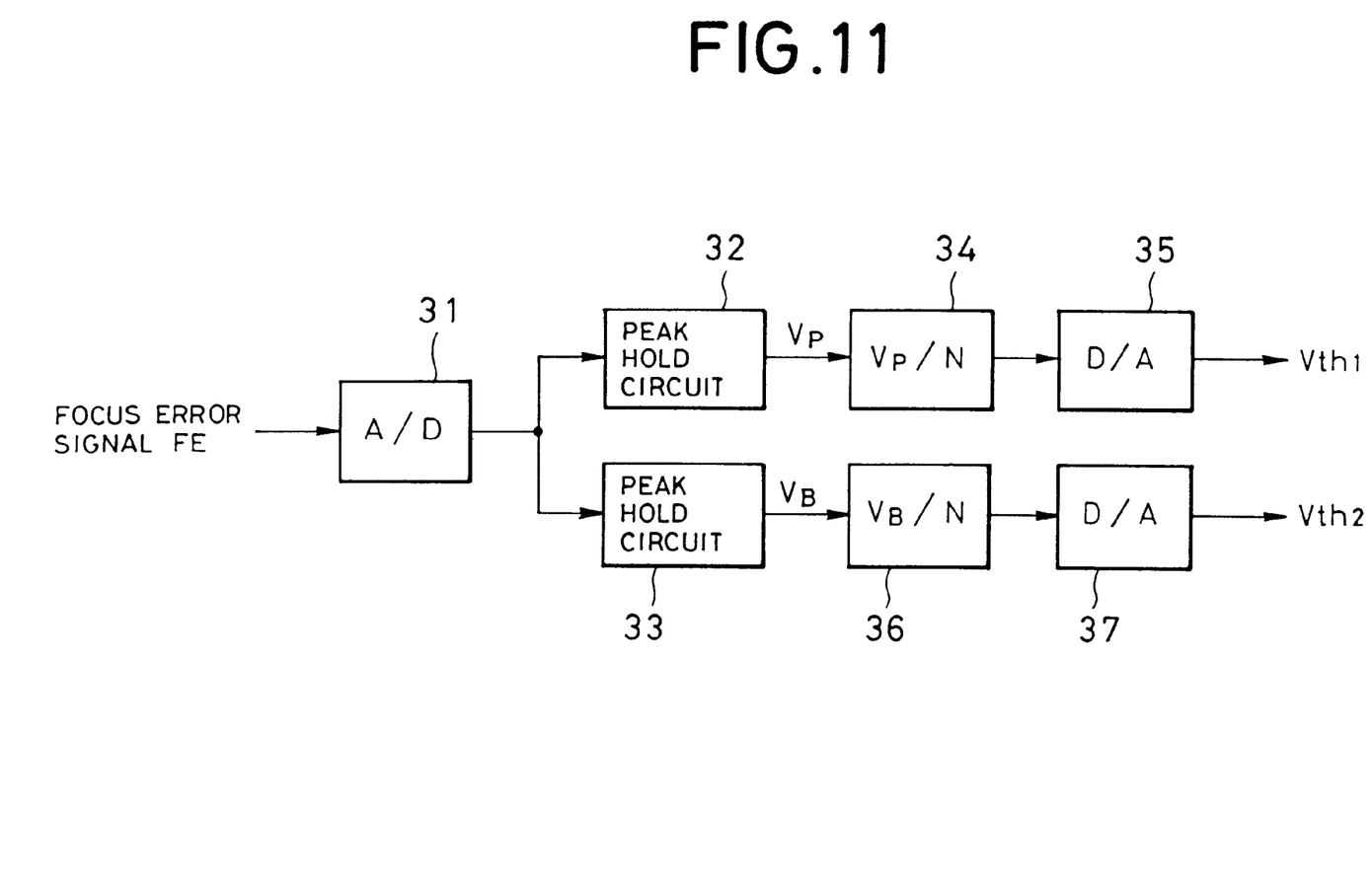
FIG. 11 is a block diagram of a threshold value setting circuit.

A hardware structure as shown in FIG. 11 may be formed to compute the positive threshold value Vth1 and the negative threshold value Vth2 as will be discussed specifically below. The focus error signal FE is converted by an A/D converter 31 to a digital signal which is in turn supplied to a positive peak hold circuit 32 and a negative peak hold circuit 33. The positive peak hold circuit 32 detects and holds a positive peak voltage $V_P$, and the negative peak hold circuit 33 detects and holds a negative peak voltage $V_B$. The held positive peak voltage $V_P$ is sent to a divider 34 to compute $V_P/N$, and the computed value is converted by a D/A converter 35 to a positive threshold value Vth1 of an analog voltage which is in turn sent out. The held negative peak voltage $V_B$ is sent to a divider 36 to compute $V_B/N$, and the computed value is converted by a D/A converter 37 to a negative threshold value Vth2 of an analog voltage which is in turn sent out.

Although the foregoing description of the embodiments has been given with reference to a double-layer optical disk, the invention is not limited to this particular type but may be adapted to a focus control apparatus in an apparatus which reproduces data from multilayer optical recording media including a multilayer optical disk having three or more layers.

Although the zero-crossing threshold value setting operation is performed as an initializing operation every time a disk is loaded in a playback apparatus in the individual embodiments, the zero-crossing threshold value setting operation may be carried out at a different timing such as immediately before playback starts.

According to this invention, as the positive and negative threshold values are set in accordance with the amount of a change in the level of the focus error signal, a focus jump on a multilayer optical recording medium can be carried out adequately.

What is claimed is:

1. A focus control apparatus for a multilayer optical recording medium for implementing such focus jump control as to temporarily release a focus servo on one layer of a loaded multilayer optical recording medium, shift a focus position of read light on another target layer and then restart said focus servo on said another target layer, characterized in that a threshold value corresponding to an amount of a level change in a focus error signal of said loaded multilayer optical recording medium is set, and said focus jump control is carried out based on a result of comparison between said level of said focus error signal and said set threshold value.

2. The focus control apparatus according to claim 1, further comprising drive signal generating means for driving a focus actuator to acquire said amount of a level change.

3. A focus control apparatus for a playback apparatus for playing back a recording medium having information recording surfaces on at least two layers formed perpendicular to a surface of said recording medium, comprising:

pickup means for irradiating a read light on said recording medium, receiving return light of said read light from said recording medium, and generating a read signal indicative of information recorded on said recording medium and a focus error signal indicative of a focus error of said read light with respect to each of said information recording surfaces;

zero-crossing detection means for detecting zero-crossing by comparing a level of said focus error signal with a positive threshold value and a negative threshold value;

instruction means for generating a focus jump instruction;

drive means for performing a focus servo operation to drive a focus actuator of said pickup means in order to focus said read light on each target information recording surface in accordance with said focus error signal, starting an acceleration operation of said focus actuator in response to said focus jump instruction in order to shift a focus position of said read light from said recording surface of one of said at least two layers to said recording surface of another layer, stopping said acceleration operation in accordance with zero-crossing detection by said zero-crossing detection means, thereafter starting a deceleration operation of said focus actuator and then stopping said deceleration operation and returning to said focus servo operation in accordance with zero-crossing detection by said zero-crossing detection means; and threshold value setting means for setting said positive threshold value and said negative threshold value according to an amount of a change in a level of said focus error signal.

4. The focus control apparatus according to claim 3, wherein said threshold value setting means detects a positive peak voltage of said focus error signal and computes and sets said positive threshold value according to said positive peak voltage, and detects a negative peak voltage of said focus error signal and computes and sets said negative threshold value according to said negative peak voltage.

5. The focus control apparatus according to claim 4, wherein said drive means drives said focus actuator in such a way as to continuously move an objective lens of said pickup means within a movable range at a time said threshold value setting means sets said threshold values.

6. The focus control apparatus according to claim 3, wherein said drive means drives said focus actuator in such a way as to continuously move an objective lens of said pickup means within a movable range at a time said threshold value setting means sets said threshold values.

7. The focus control apparatus according to claim 3, wherein said threshold value setting means detects one of a positive peak voltage and a negative peak voltage of said focus error signal and computes and sets said positive threshold value and said negative threshold value according to said detected peak voltage.

8. The focus control apparatus according to claim 7, wherein said drive means drives said focus actuator in such a way as to continuously move an objective lens of said pickup means within a half of a movable range at a time said threshold value setting means sets said threshold values.

9. The focus control apparatus according to claim 7, wherein said threshold value setting means detects the other one of said positive peak voltage and said negative peak voltage of said focus error signal and sets said positive threshold value or said negative threshold value again in said acceleration operation.

10. The focus control apparatus according to claim 7, wherein said threshold value setting means performs a threshold value setting operation as an initializing operation every time a recording medium is loaded in said playback apparatus.

11. The focus control apparatus according to claim 3, wherein said drive means drives said focus actuator in such a way as to continuously move an objective lens of said pickup means within a half of a movable range at a time said threshold value setting means sets said threshold values.

12. A focus control method for implementing a focus jump operation, wherein said focus jump operation shifts a focal position of an optical pickup from a first layer of a multilayer recording medium to a second layer of said multilayer recording medium and wherein the method comprises:

(a) determining a first threshold value by evaluating a focus error signal; and (b) performing said focus jump operation by comparing said focus error signal with said first threshold value.

13. The method as claimed in claim 12, wherein the operation (a) comprises:

(a1) determining a first value of said focus error signal and setting said first threshold value equal to a first predetermined fraction of said first value.

14. The method as claimed in claim 13, wherein said first value is a maximum value of said focus error signal.

15. The method as claimed in claim 13, wherein said first value is a minimum value of said focus error signal.

16. The method as claimed in claim 13, wherein said operation (a1) comprises:

(a1a) moving said optical pickup to a first position with respect to said multilayer recording medium;

(a1b) after moving said optical pickup to said first position, moving said optical pickup from said first position to a second position with respect to said multilayer recording medium;

(a1c) determining said first value of said focus error signal as said optical pickup moves from said first position to said second position, wherein said first value is a first extreme value of said focus error signal;

(a1d) setting said first threshold value equal to said first predetermined fraction of said first extreme value.

17. The method as claimed in 16, wherein said operation (a1) further comprises:

(a1e) determining a second extreme value of said focus error signal as said optical pickup moves from said first position to said second position;

(a1f) setting a second threshold value equal to a second predetermined fraction of said second extreme value.

18. The method as claimed in claim 17, wherein said first extreme value equals a maximum value of said focus error signal and said second extreme value equals a minimum value of said focus error signal.

19. The method as claimed in claim 17, wherein said first extreme value equals a minimum value of said focus error signal and said second extreme value equals a maximum value of said focus error signal.

20. The method as claimed in claim 17, wherein said first predetermined fraction and said second predetermined fraction are equal.

21. The method as claimed in claim 17, wherein said operation (b) comprises:

(b1) receiving a focus jump instruction;

(b2) accelerating a movement of said optical pickup, at an increased speed, towards one of said first position and said second position in response to said focus jump instruction;

(b3) determining if said focus error signal and said first threshold value have a first predetermined relationship;

(b4) after said focus error signal and said first threshold value have said first predetermined relationship, determining if said focus error signal and said second threshold value have a second predetermined relationship; and (b5) after said focus error signal and said second threshold value have said second predetermined relationship, decelerating said movement of said optical pickup.

22. The method as claimed in claim 21, wherein said operation (b) further comprises:

(b6) after decelerating said movement of said optical pickup, determining if said focus error signal and said second threshold value have a third predetermined relationship; and (b7) after said focus error signal and said second threshold value have said third predetermined relationship, cease decelerating said movement of said optical pickup.

23. The method as claimed in claim 16, wherein said operation (a1) further comprises:

(a1e) setting a second initial threshold value equal to a second predetermined fraction of a inverse of said first extreme value.

24. The method as claimed in claim 23, wherein said operation (b) comprises:

(b1) receiving a focus jump instruction;

(b2) accelerating a movement of said optical pickup, at an increased speed, towards one of said first position and said second position in response to said focus jump instruction;

(b3) determining if said focus error signal and said second initial threshold value have a first predetermined relationship;

(b4) before said focus error signal and said second initial threshold value have said first predetermined relationship, determining a second extreme value of said focus error signal;

(b5) after said focus error signal and said second initial threshold value have said first predetermined relationship, determining if said focus error signal and said first threshold value have a second predetermined relationship; and (b6) after said focus error signal and said first threshold value have said second predetermined relationship, decelerating said movement of said optical pickup.

25. The method as claimed in claim 24, wherein said operation (b) further comprises:

(b7) after decelerating said movement of said optical pickup, determining if said focus error signal and said first threshold value have a third predetermined relationship; and (b8) after said focus error signal and said first threshold value have said third predetermined relationship, cease decelerating said movement of said optical pickup.

26. A focus control apparatus for implementing a focus jump operation, comprising:

an optical pickup, wherein said focus jump operation shifts a focal position of said optical pickup from a first layer of a multilayer recording medium to a second layer of said multilayer recording medium;

a focus error generator that inputs a signal from the optical pickup and generates a focus error signal based on said focal position of optical pickup; and a focus controller, wherein said focus controller inputs said focus error signal from said focus error generator, determines a first threshold value by evaluating a focus error signal, and performs said focus jump operation by comparing said focus error signal with said first threshold value.

27. The apparatus as claimed in claim 26, wherein the focus controller determines said first threshold value by determining a first value of said focus error signal and setting said first threshold value equal to a first predetermined fraction of said first value.

28. The apparatus as claimed in claim 27, wherein said first value is a maximum value of said focus error signal.

29. The apparatus as claimed in claim 27, wherein said first value is a minimum value of said focus error signal.

30. The apparatus as claimed in claim 27, wherein said focus controller instructs said optical pickup to move to a first position with respect to said multilayer recording medium;

wherein, after moving said optical pickup to said first position, said focus controller instructs said optical pickup to move from said first position to a second position with respect to said multilayer recording medium;

wherein said focus controller determines said first value of said focus error signal as said optical pickup moves from said first position to said second position, wherein said first value is a first extreme value of said focus error signal;

wherein said focus controller sets said first threshold value equal to said first predetermined fraction of said first extreme value.

31. The apparatus as claimed in 30, wherein said focus controller determines a second extreme value of said focus error signal as said optical pickup moves from said first position to said second position, and wherein said focus controller sets a second threshold value equal to a second predetermined fraction of said second extreme value.

32. The apparatus as claimed in claim 31, wherein said first extreme value equals a maximum value of said focus error signal and said second extreme value equals a minimum value of said focus error signal.

33. The apparatus as claimed in claim 31, wherein said first extreme value equals a minimum value of said focus error signal and said second extreme value equals a maximum value of said focus error signal.

34. The apparatus as claimed in claim 31, wherein said first predetermined fraction and said second predetermined fraction are equal.

35. The apparatus as claimed in claim 31, wherein said focus controller receives a focus jump instruction and instructs the optical pickup to move, at an increased speed, towards one of said first position and said second position in response to said focus jump instruction, wherein said focus controller determines if said focus error signal and said first threshold value have a first predetermined relationship, wherein, after said focus error signal and said first threshold value have said first predetermined relationship, said focus controller determines if said focus error signal and said second threshold value have a second predetermined relationship, and wherein, after said focus error signal and said second threshold value have said second predetermined relationship, said focus controller decelerates a movement of said optical pickup.

36. The apparatus as claimed in claim 35, wherein said after decelerating said movement of said optical pickup, said focus controller determines if said focus error signal and said second threshold value have a third predetermined relationship, and wherein, after said focus error signal and said second threshold value have said third predetermined relationship, said focus controller ceases decelerating said movement of said optical pickup.

37. The apparatus as claimed in claim 30, wherein said focus controller sets a second initial threshold value equal to a second predetermined fraction of a inverse of said first extreme value.

38. The apparatus as claimed in claim 37, wherein said focus controller receives a focus jump instruction and moves said optical pickup, at an increased speed, towards one of said first position and said second position in response to said focus jump instruction, wherein said focus controller determines if said focus error signal and said second initial threshold value have a first predetermined relationship, wherein, before said focus error signal and said second initial threshold value have said first predetermined relationship, said focus controller determines a second extreme value of said focus error signal, wherein, after said focus error signal and said second initial threshold value have said first predetermined relationship, said focus controller determines if said focus error signal and said first threshold value have a second predetermined relationship, and wherein, after said focus error signal and said first threshold value have said second predetermined relationship, said focus controller decelerates a movement of said optical pickup.

39. The apparatus as claimed in claim 38, wherein, after decelerating said movement of said optical pickup, said focus controller determines if said focus error signal and said first threshold value have a third predetermined relationship, and wherein, after said focus error signal and said first threshold value have said third predetermined relationship, said focus controller ceases decelerating said movement of said optical pickup.

* * * * *